(12) United States Patent
Yamamoto

(10) Patent No.: US 7,441,634 B2
(45) Date of Patent: Oct. 28, 2008

(54) FRICTION DRIVE DEVICE

(75) Inventor: Takeshi Yamamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/016,981

(22) Filed: Dec. 21, 2004

(65) Prior Publication Data
US 2005/0143211 A1   Jun. 30, 2005

(30) Foreign Application Priority Data

Dec. 26, 2003  (JP)  ............................. 2003-433910
Mar. 2, 2004   (JP)  ............................. 2004-057639

(51) Int. Cl.
*F16D 63/00* (2006.01)
*F16D 51/60* (2006.01)

(52) U.S. Cl. ...................... 188/82.84; 475/183; 192/45; 188/83

(58) Field of Classification Search ............. 188/82.84, 188/83, 136, 72.7; 475/183, 192; 192/45, 192/45.1, 45.2
See application file for complete search history.

(56) References Cited

U.S. PATENT DOCUMENTS

| | | | | |
|---|---|---|---|---|
| 2,345,203 A | * | 3/1944 | La Via | 188/167 |
| 4,280,605 A | * | 7/1981 | Papadopoulos | 192/223.3 |
| 4,297,920 A | * | 11/1981 | Richter | 475/168 |
| 5,543,596 A | * | 8/1996 | Jones et al. | 200/573 |
| 6,543,592 B2 | * | 4/2003 | Hori | 192/45 |
| 2003/0159895 A1 | * | 8/2003 | Conboy et al. | 188/72.2 |

FOREIGN PATENT DOCUMENTS

| | | |
|---|---|---|
| JP | 8-277896 A | 10/1996 |
| JP | 2001-173743 A | 6/2001 |
| JP | 2002-349654 | 12/2002 |
| JP | 2002-349654 A | 12/2002 |

OTHER PUBLICATIONS

Article / Second Edition—"Automatic Transmissions and Transaxles"—Prentice Hall (Columbus, Ohio)—Tom Birch/Chuck Rockwood, 2002.
"Idler-wheel" / Internet—Wikipedia Encyclopedia Definition—(obtained from Internet on May 25, 2007).
Grand Prix Automobile Term Dictionary—Grand Prix Publication, 1992.

* cited by examiner

*Primary Examiner*—Melody M Burch
(74) *Attorney, Agent, or Firm*—Foley & Lardner LLP

(57) ABSTRACT

A friction drive device includes a first roller with a support part, a second roller, and a cam member to support them. The second roller receives press force from the first roller at a contact point of them so as to transmit mechanical power therebetween. The cam member has a cam formed with a cam slope on which the support part of the first roller is pressed by reaction torque from the second roller that is caused by transmission torque applied from the first roller. The cam slope is formed to have an angle with respect a tangent line at the contact point so that the first roller is pressed by reaction force of the cam to apply the press force proportional to the transmission torque to the second roller.

18 Claims, 21 Drawing Sheets

FRICTION DRIVE DEVICE

BACKGROUND OF THE INVENTION

1. Field of the Invention

The present invention relates to a friction drive device that is equipped a drive roller and a driven roller that are pressed to contact with each other so as to transfer mechanical power between them at a reduction ratio or an overdrive speed ratio.

2. Description of the Related Art

A friction drive device of this kind is disclosed in Japanese patent laying-open publication No. 2001-173743. In this drive device, a drive roller and a driven roller are pressed to contact with each other so that friction force caused at their contact point enables the rollers to transmit mechanical power between them. The press force are obtained by adjusting bolts of a roller support portion so that their center distance becomes smaller.

Another friction drive device of this kind is disclosed in Japanese patent laying-open publication No. 2002-349654. This drive device has a wedge roller arranged between drive and driven rollers to have a contact point of the drive roller and wedge roller and another contact point of the driven roller and the wedge roller in a manner that their tangents at the contact points differ from each other.

The above known conventional friction drive devices, however, encounter a problem that lifetime of the roller and bearings of the rollers are shortened and power transmission efficiency between the rollers deteriorates. This reason comes from the following: in the former drive device, the press force between the rollers does not change according to the transmission torque between the rollers, and can not be adjusted optimally both in low and high torque transmitting ranges. In the latter drive device, the drive and driven rollers are depressed to cause elastic deformation at their contact points by further ingression of the wedge roller into the drive and driven rollers when the press force becomes larger according to the transmitting torque between the rollers.

In order to avoid the above problem that the press force can not be optimally controlled according to the transmission torque between the rollers, Japanese patent laying-open publication No. (Hei) 8-277896 discloses a friction drive device having an air cylinder to control press force at a minimum optical level according to transmitting torque between a drive and driven rollers. This drive device, however, needs the air cylinder, a pump to supply pressurized air to the cylinder, and a control unit to control the cylinder, which results in deterioration of total efficiency and high manufacturing costs.

It is, therefore, an object of the present invention to provide a friction drive device which overcomes the foregoing drawbacks and can obtain press force varied according to transmitting torque without an expensive or complicate device and thereby improve its lifetime and its power transmission efficiency.

SUMMARY OF THE INVENTION

According to a first aspect of the present invention there is provided a friction drive device comprising: a first roller with a support part; a second roller that receives press force from the first roller at a contact point of the first and second rollers so as to transmit mechanical power between the first and second rollers; and a cam member supporting the first roller through the support part and having a cam formed with a cam slope on which the support part of the first roller is pressed by reaction torque from the second roller that is caused by transmission torque applied from the first roller, the cam slope being formed to have an angle with respect a tangent line at the contact point so that the first roller is pressed by reaction force of the cam to apply the press force proportional to the transmission torque to the second roller.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
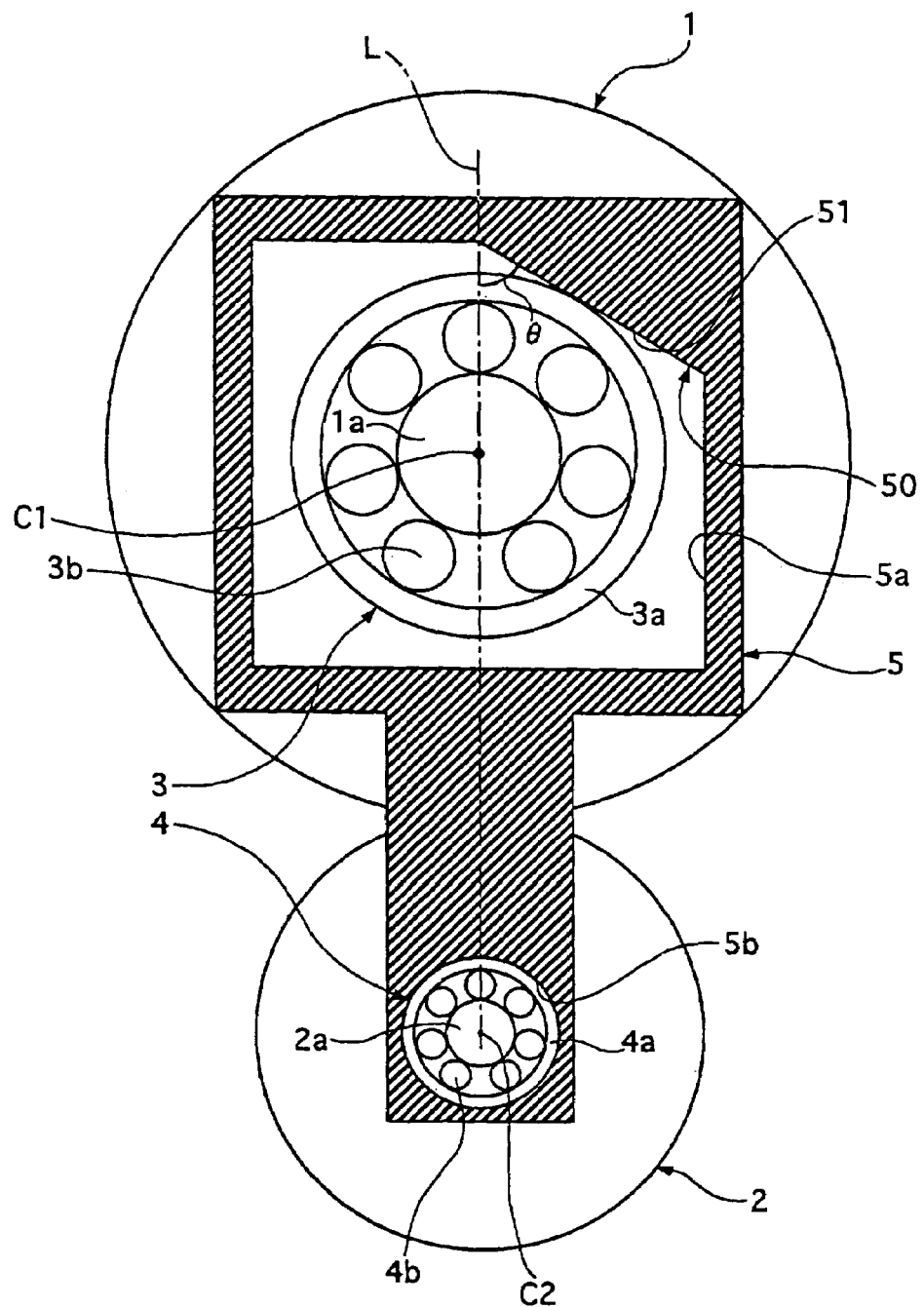
FIG. 1 is a schematic diagram showing a friction drive device according to a first embodiment of the present invention.

Throughout the following, detailed description, similar reference characters and numbers refer to similar elements in all figures of the drawings, and their descriptions are omitted for eliminating duplication.

Referring to FIG. 1 of the drawing, there is shown a friction drive device according to a first preferred embodiment of the present invention.

The friction drive device has a drive roller 1 and a driven roller 2, which are pressed against each other so that mechanical power can be transmitted between the rollers 1 and 2 by friction force caused at their contact point. The drive roller 1 corresponds to a first roller of the present invention, while the driven roller 2 corresponds to a second roller of the present invention.

The drive and driven rollers 1 and 2 are rotatably supported by a frame member 5 at its one side portion, an upper portion of the frame member shown in FIG. 1, and at its other side portion, a lower portion of the frame member shown in the FIG. 1, respectively. The drive roller 1 is integrally formed at its center with a shaft 1a, which is rotatably supported by the one side portion of the frame member 5 through a roller bearing 3. The shaft 1a acts as an inner race of the bearing 3, and hence the bearing 3 is made up of the shaft 1a, an outer race 3a, and a plurality of balls 3b arranged between them. The frame member 5 corresponds to a cam member of the present invention. The roller bearing 3 corresponds to a support part of the present invention.

The driven roller 2 is integrally formed at its center with a shaft 2a, which is rotatably supported by the other side portion of the frame member 5 through a roller bearing 4. The shaft 2a acts as an inner race of the bearing 4, and hence the bearing 4 is made up of the shaft 2a, an outer race 4a, and a plurality of balls 4b arranged between them.

The frame member 5 is formed at the one side portion thereof with a trapezoidal hole 5a to be inserted by the shaft 1a of the drive roller 1 and at the other side portion thereof with a round hole 5b to be inserted by the shaft 2a of the driven roller 2. Along a side portion of trapezoidal hole 5a, the frame member 5 is provided with a cam 50 onto which the outer race 3a of the bearing 3 is pressed. The cam 50 has a cam slope 51 that is positioned at a range opposite to the center C2 of the driven roller 2 with respect to the center C1 of the drive roller 1 and intersects at an angle of θ with respect to a straight center connecting line L passing through the centers C1 and C2 of the drive and driven rollers 1 and 2. The round hole 5b is also formed to have the same diameter as the outer race 4a, so as to fixes it.

Figure 2:
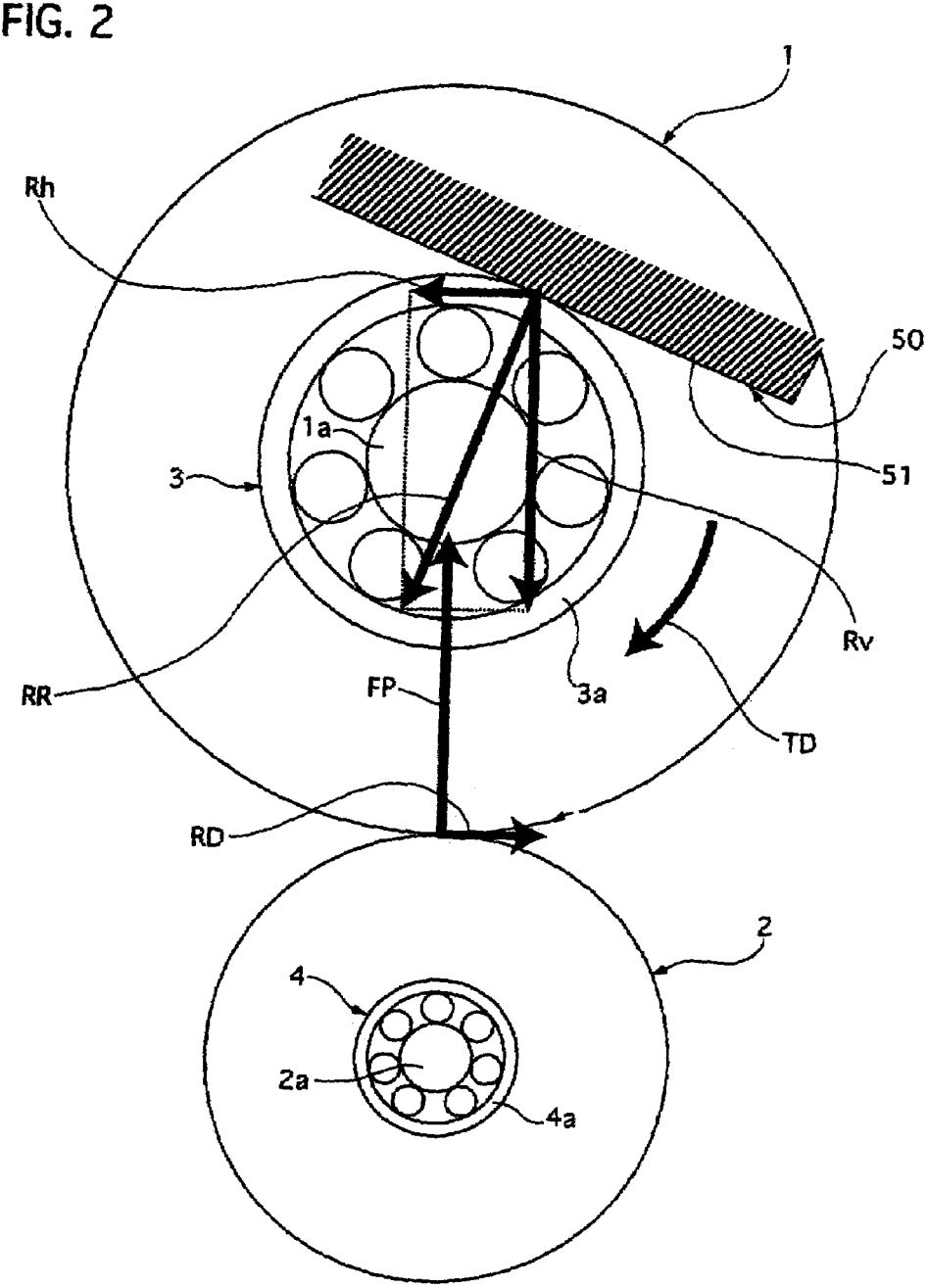
FIG. 2 is a diagram showing relationships of forces and torque acting on a drive roller of the friction drive device shown in FIG. 1.

This friction drive device operates as follows:

As shown in FIG. 2, when the drive roller 1 rolls to apply its drive torque TD to the driven roller 2, the drive roller 1 receives reaction force RD from the driven roller 2 at their contact point in a direction along a tangent line, perpendicular to the line L, on the contact point. The reaction force RD presses the outer race 3a of the bearing 3 of the drive roller 1 onto the cam slope 51 of the cam 50, which causes the cam 50 to apply reaction force RR to the drive roller 1 in a direction normal to the cam slope 51. This reaction force RR from the cam 50 can be divided into a horizontal part Rh in a direction perpendicular to the line L and a vertical part Rv in a direction parallel to the line L. The ratio of the vertical part Rv to the horizontal part Rh is determined based on the angle θ. The vertical part Rv is, therefore, proportional to drive torque TD of the drive roller 1 when the angle θ is set constant. This enables the drive roller 1 to be pressed onto the driven roller 2 by the vertical part Rv, thereby transmitting mechanical power between them according to drive torque TD.

Figure 3:
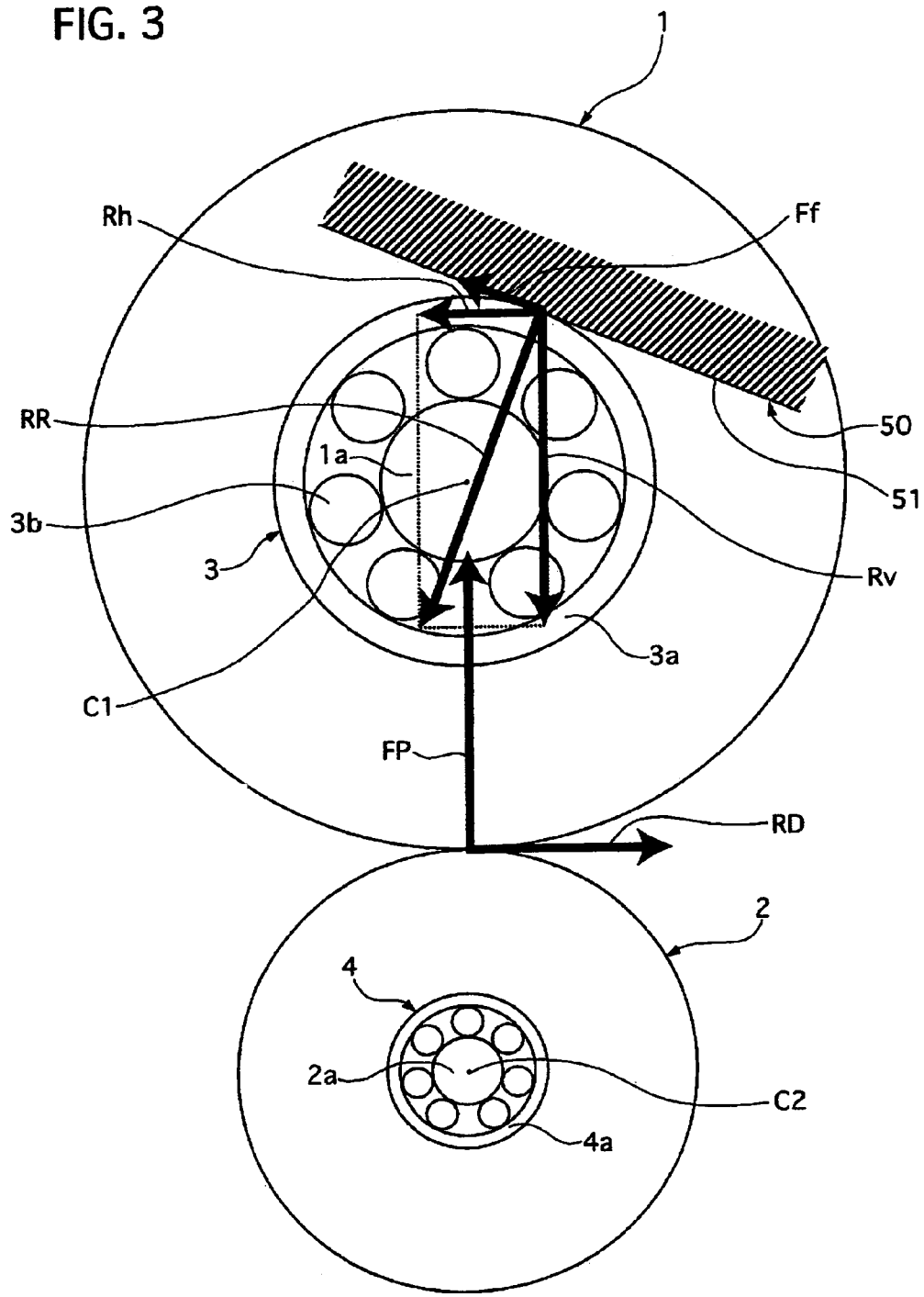
FIG. 3 is a diagram showing relationships of forces and the torque acting on the drive roller of the friction drive device shown in FIG. 1 when large friction force causes between the drive roller and a cam of the friction drive shown in FIG. 1.

Note that the roller bearing 3 greatly reduces friction force Ff, as shown in FIG. 3, caused between the outer race 3a of the bearing 3 and the cam 50 of the frame member 5, thus obtaining large vertical part Rv of the cam reaction force RR, while without the bearing 3, the above friction force Ff becomes larger, so that the vertical part Rv and hence press force between the rollers 1 and 2 becomes smaller, resulting in reduction of power transmission between the rollers 1 and 2.

The friction drive device of the first embodiment has advantages in that the rollers 1 and 2 are pressed by the press force proportional to the drive torque TD without a complicate structure, improving its duration of life and power transmission efficiency. In addition, in this drive device, the roller bearing 3 can reduce the friction force caused between its outer race 3a of the bearing 3 provided on the drive roller 1 and the cam 50 formed on the frame member 5, which prevents decrease of the press force between the rollers 1 and 2.

Next, a friction drive device of a second embodiment of the present invention will be described with the accompanying drawing of FIG. 4.

This friction drive device is equipped with a frame member 5 formed with a cam 5 having a first cam slope 51 and a second cam slope 52. The first cam slope 51 is formed similarly to the cam slope 51 of the cam 50 of the first embodiment shown in FIG. 1, while the second cam slope 52 is formed symmetrically to the came slope 52 with respect to a center connecting line L when the transmission torque is zero. The other parts of the drive device are similar to those of the drive device of the first embodiment shown in FIG. 1.

When the drive roller 1 applies drive torque in a first direction indicated by an arrow D1, an outer race 3a of a roller bearing 3 provided on the drive roller 1 is depressed onto the first cam slope 51, while the drive roller 1 applies drive torque in a second direction opposite to the first direction, the outer race 3a is depressed onto the second cam slope 52, resulting in press force between the rollers 1 and 2 in the above both case.

This enables the first and second rollers 1 and 2 to be pressed against each other despite of the directions of drive torque of the drive roller 1.

Next, a friction drive device of a third embodiment will be described with the accompanying drawing of FIG. 5.

Figure 4:
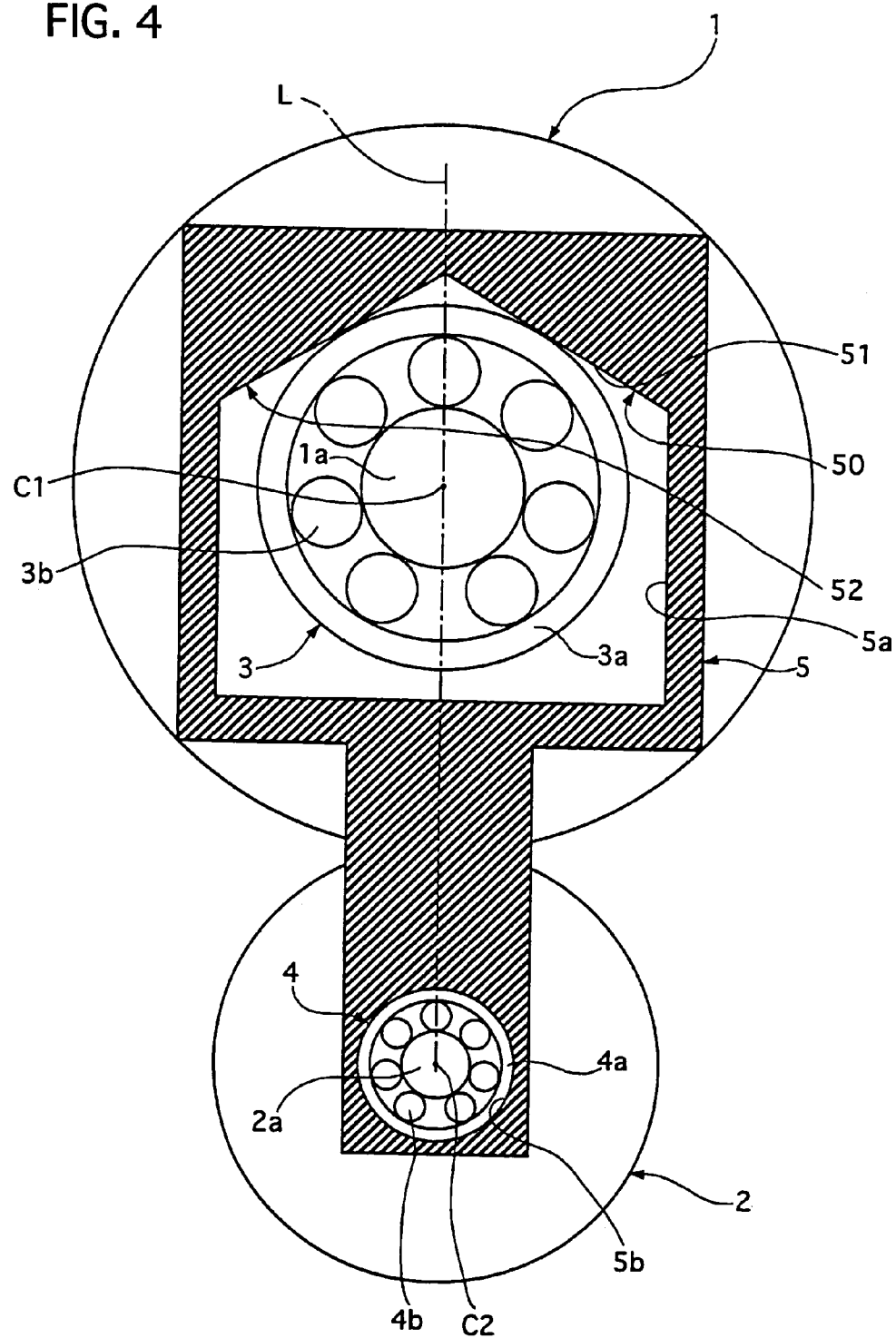
FIG. 4 is a schematic diagram showing a friction drive device according to a second embodiment of the present invention.
Figure 5:
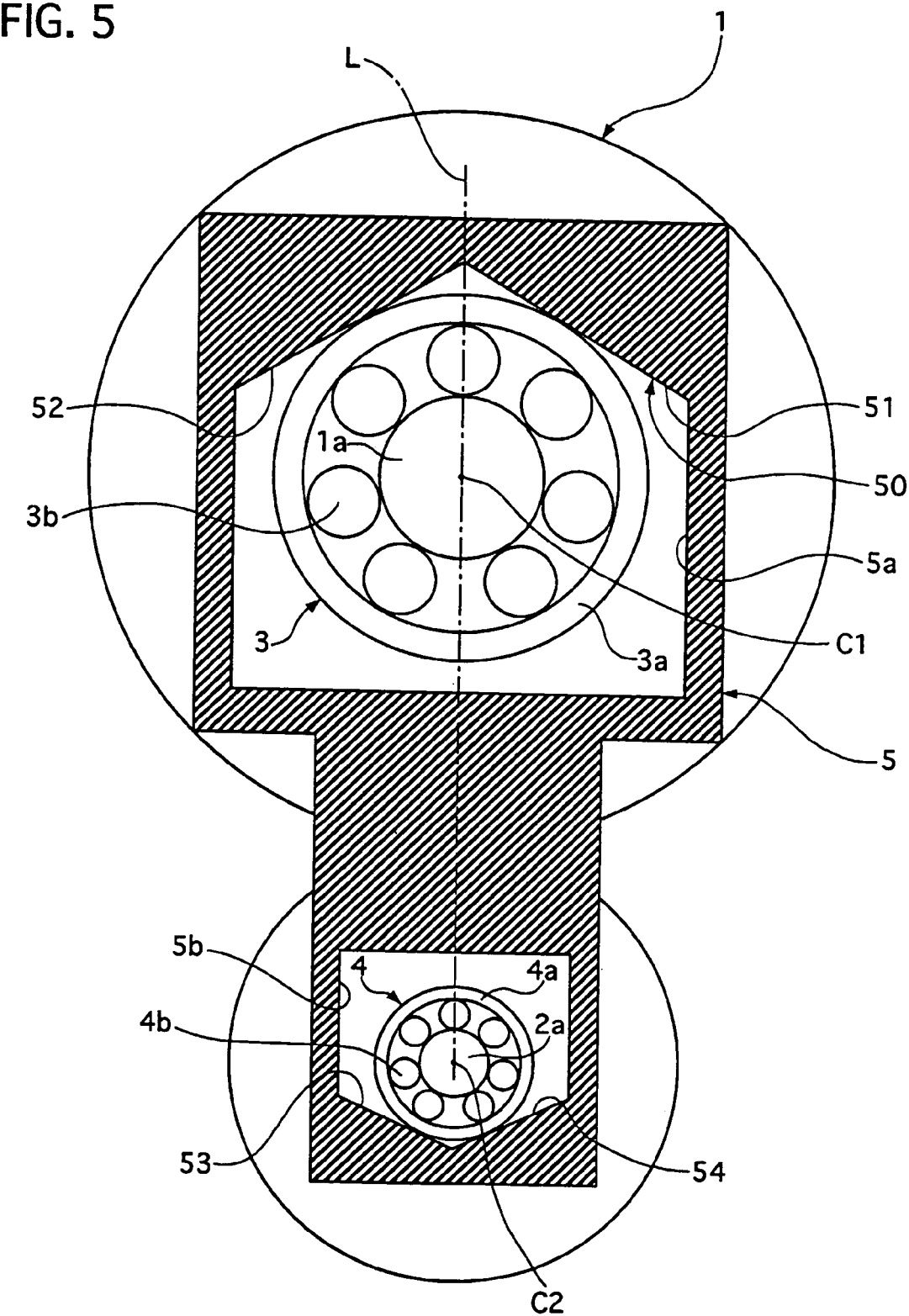
FIG. 5 is a schematic diagram showing a friction drive device according to a third embodiment of the present invention.

This friction drive device is equipped with a frame member 5 formed at its other side portion, a lower side portion of the frame member 5 shown in FIG. 5, with a cam 5A having a third cam slope 53 and a fourth cam slope 54. These cam slopes 53, and 54 are formed symmetrically to first and second cam slope 51 and 52 with respect to the middle point between a center C1 of a drive roller 1 and a center C2 of a driven roller 2. An outer race 4a of a roller bearing 4 provided on the driven roller 2 is contactable with at least one of the cam slopes 53 and 54. The other parts of the drive device are similar to those of the drive device of the second embodiment shown in FIG. 4.

When the drive roller 1 applies drive torque in a first direction indicated by an arrow D1, an outer race 3a of the drive roller 1 and the outer race 4a of the driven roller 2 are depressed onto the first and third cam slopes 51 and 53, respectively, while the drive roller 1 applies drive torque in a second direction opposite to the first direction, the outer races 3a and 4a are depressed onto the second and fourth cam slopes 52 and 54 respectively, thereby producing press force between the rollers 1 and 2 in the above both case.

This enables the first and second rollers 1 and 2 to be pressed against each other despite of the directions of drive torque applied to the rollers 1 and 2, the first and second directions, from the cams 5 and 5A.

Next, a friction drive device of a fourth embodiment will be described with the accompany drawing.

Figure 6:
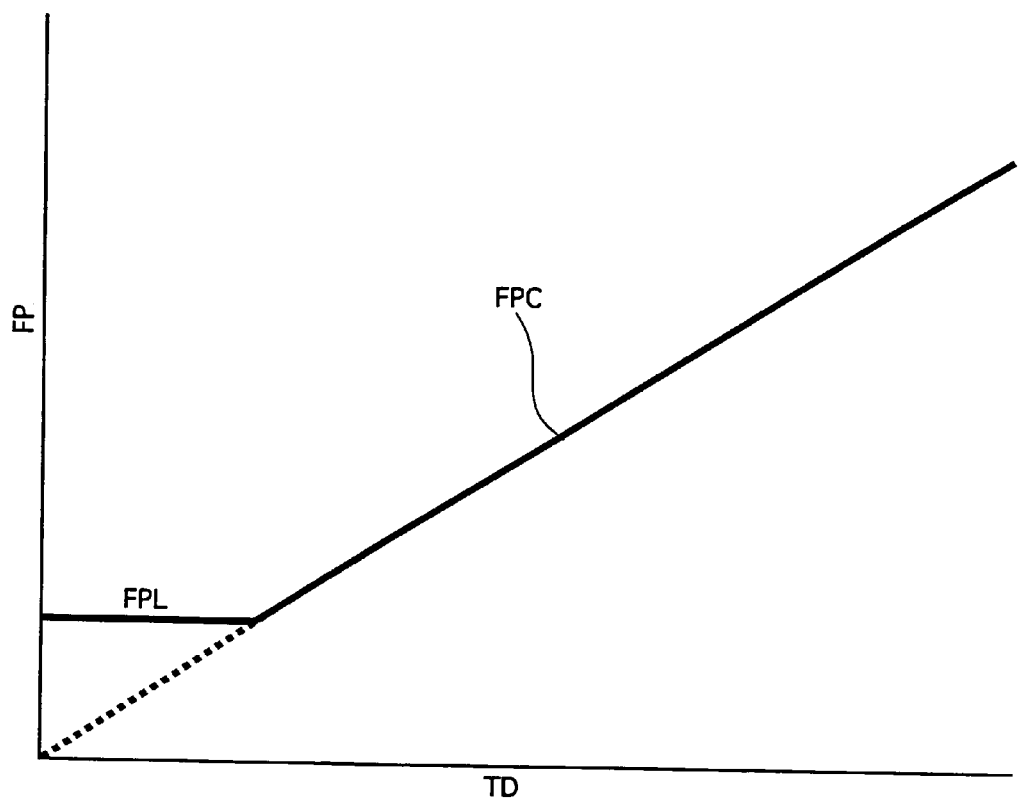
FIG. 6 is a diagram showing a relationship between transmission torque and press force between the drive roller and a driven roller of a friction drive device according to a fourth embodiment of the present invention.

This friction drive device has a structure similar to the first to third embodiments shown in FIGS. 1, 4, and 5, except that a frame member 5 applies pre-load to the outer races 3a and 4a in a direction where they approach to each other. This pre-load is set sufficiently smaller than press force between the rollers 1 and 2 that is produced when the largest drive torque is transmitted between the rollers 1 and 2. The drive device, therefore, can transmit quite small torque between the rollers 1 and 2 even in a low drive torque range where sufficient press force is hardly obtained due to viscous drag of a lubricant and friction resistance of roller bearings 3 and 4 under low transmission torque conditions. FIG. 6 shows a relationship between the press force FP and the transmitting torque TD between the rollers 1 and 2. Note that the amount of the press force is increased at the minimum level FPL under the low transmission torque conditions and then increases its level as indicted by a line FPC proportionally to the transmitting torque TD.

The drive device of the fourth embodiment has advantages in that mechanical power can be transmitted between the rollers 1 and 2 even under quite small transmitting torque conditions and eliminate backlash between the rollers 1 and 2, in addition to those of the friction drive devices of the first to third embodiment.

Next, a friction drive device of a fifth embodiment according to the present invention will be described with the accompanying drawings of FIGS. 7 to 10.

Figure 7:
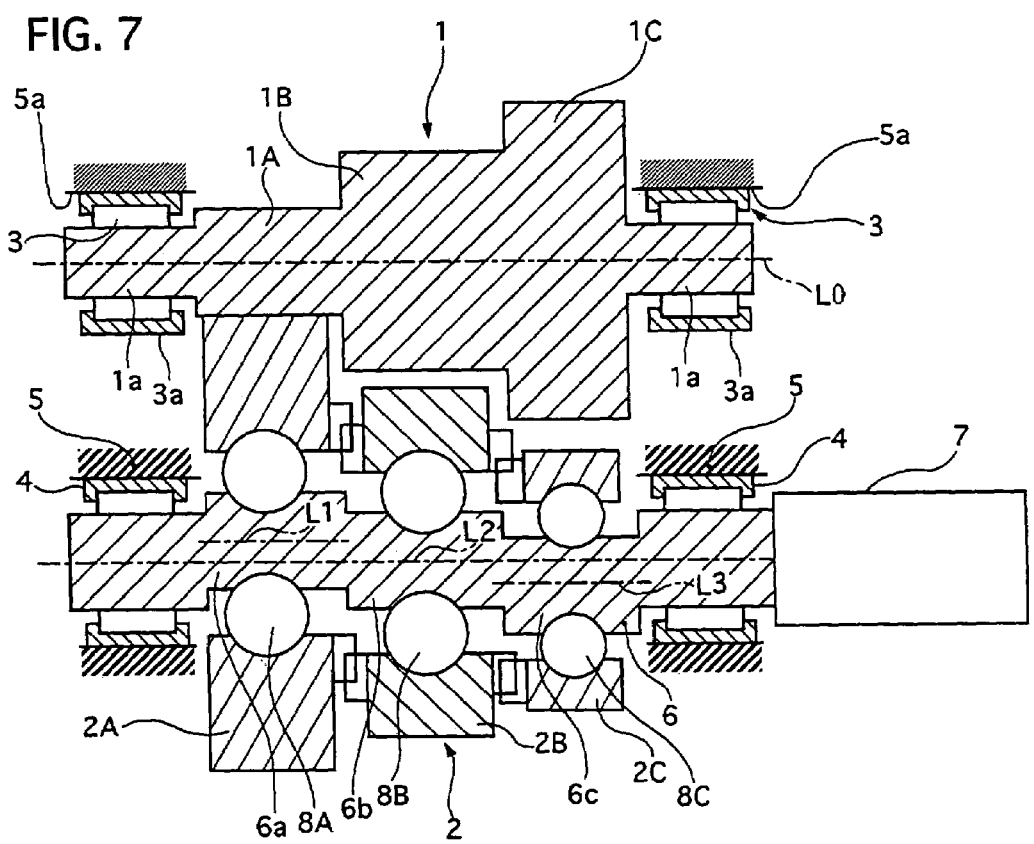
FIG. 7 is a schematic diagram showing a friction drive device with a plurality of roller sets according to a fifth embodiment of the present invention.

As shown in FIG. 7, this friction drive device is equipped with a drive roller 1 and a driven roller 2, which are made up of a plurality of roller sets that have different diameters from each other, transmitting drive torque between the selected roller set by changing center distances of the roller sets.

The drive roller 1 is rotatable around an center axis L0. The drive roller 1 is formed to have shaft portions 1a arranged at the both end of the roller 1 respectively, and a first drive roller portion 1A, a second drive roller portion 1B, a third drive roller portion 1C that are arranged in these turn between the drive shaft portions 1a. The diameters of the first drive to third roller portions 1A, 1B, and 1C are set larger in these turn. The shaft portions 1a, the first to third drive roller portions 1A, 1B, and 1C are integrally formed with each other. The drive shaft portions 1a are equipped with a roller bearing 3 so that their outer races 3a can be pressed onto a cam slope 51 of a cam 50 of a frame member 5.

The driven roller 2 has a first driven roller 2A rotatable around a first center axis L1 thereof, a second driven roller 2B rotatable around a second center axis L2 thereof, and a third driven roller 2C rotatable around a third center axis L3 thereof that are arranged in these turn. The rollers 2A, 2B, and 2C are rotatably supported on an eccentric shaft 6 through first balls 8a, second balls 8b, and third balls 8c, respectively. The diameters of the first driven roller 2A, the second driven roller 2B, and the third driven roller 1C are set to become smaller in these turn.

Figure 8:
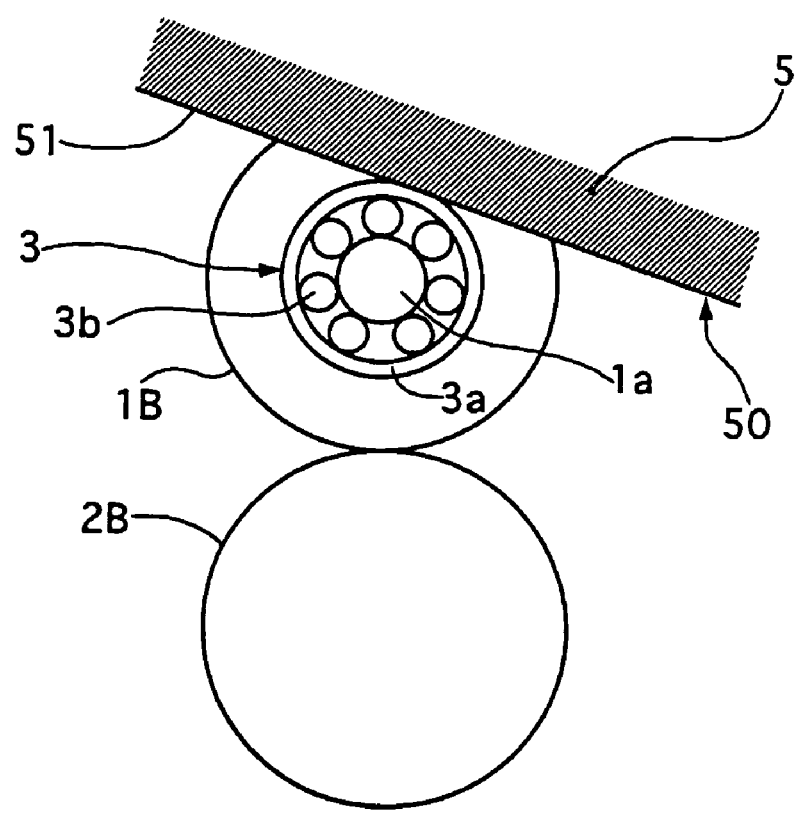
FIG. 8 is a schematic diagram showing a supporting structure of the drive roller of the friction drive device of the fifth embodiment shown in FIG. 7.
Figure 9:
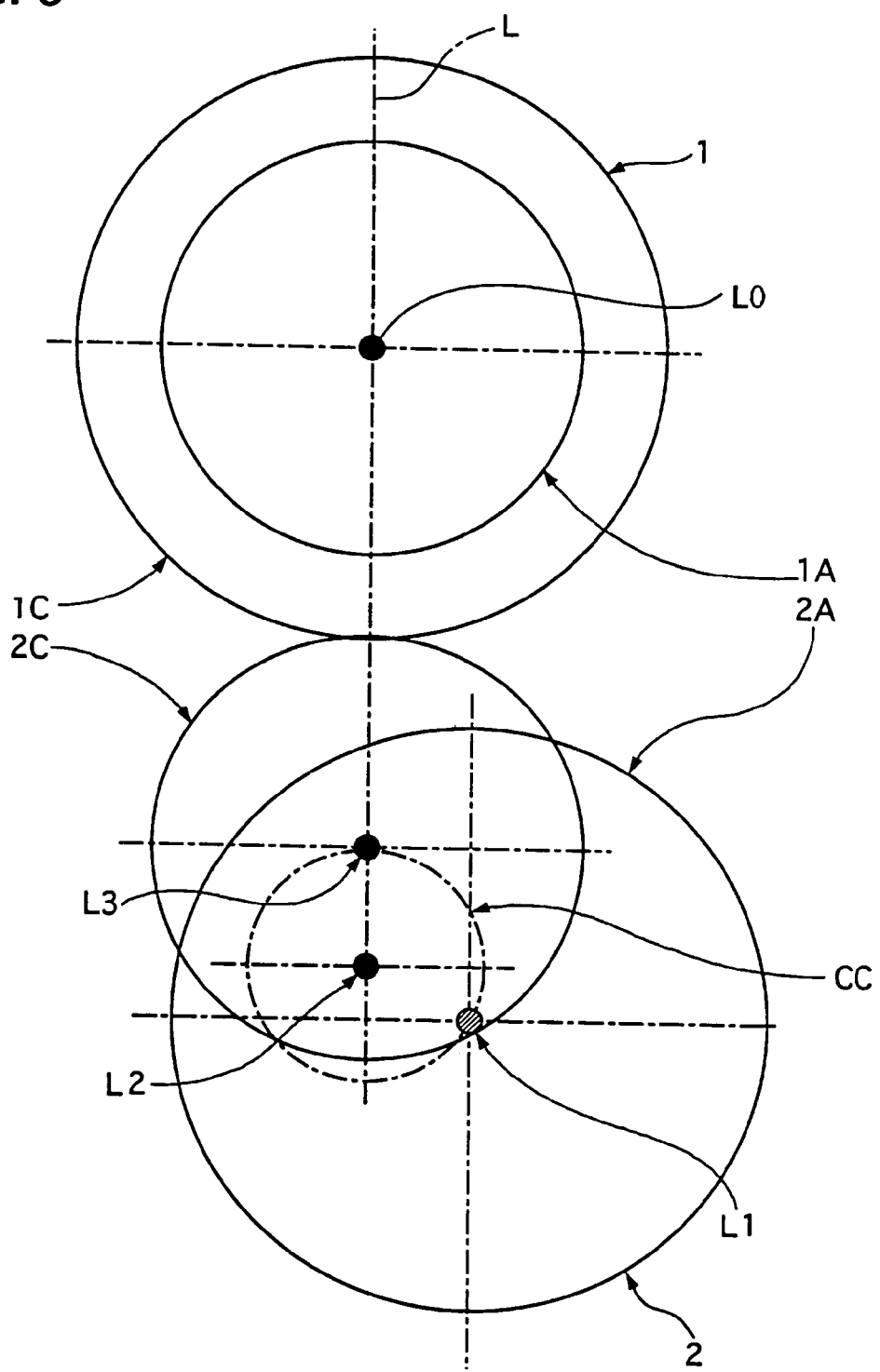
FIG. 9 is a schematic diagram showing relationships between the roller sets at overdrive speed ratio in the friction drive device of the fifth embodiment shown in FIG. 7.
Figure 10:
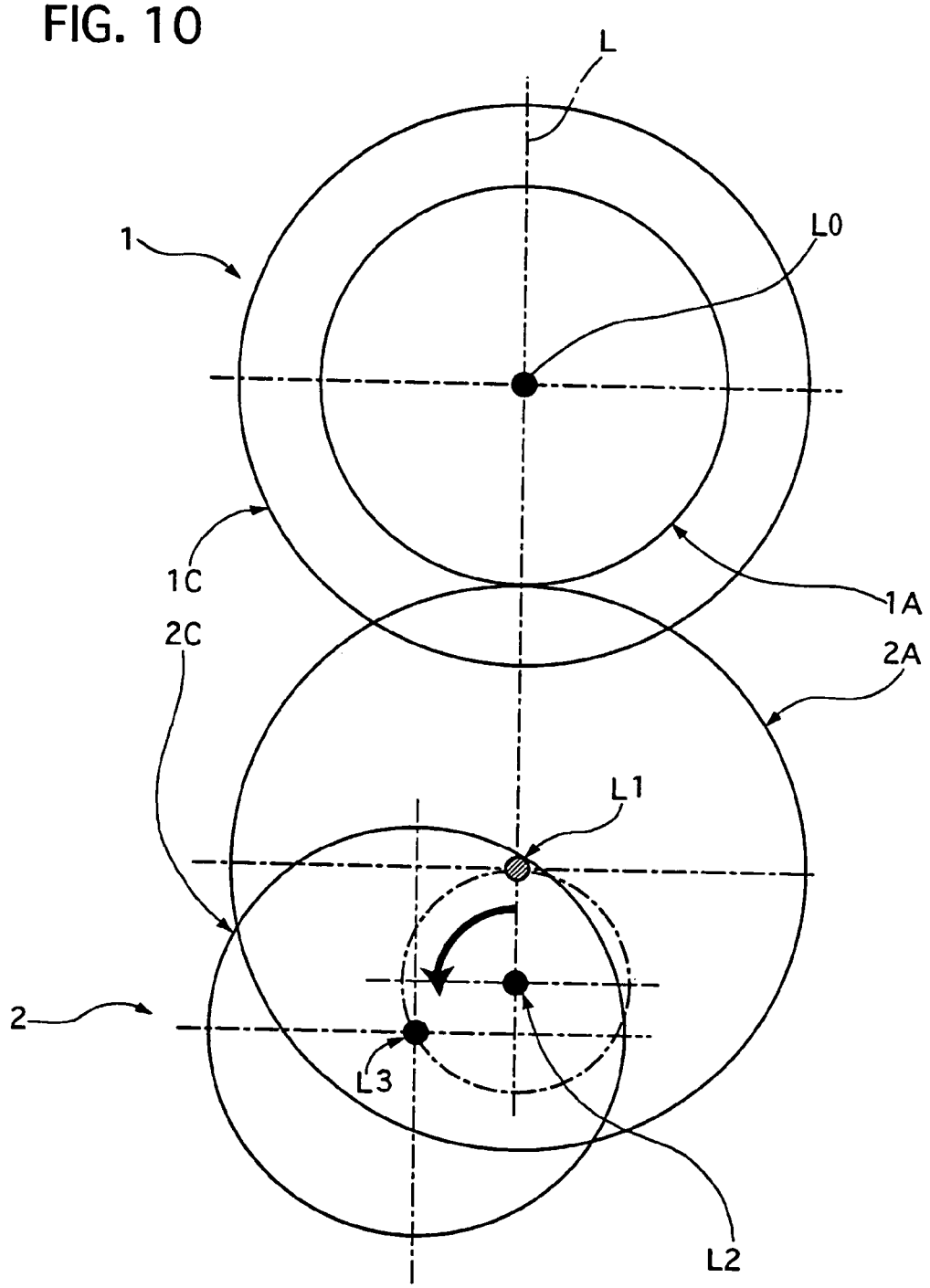
FIG. 10 is a schematic diagram showing relationships between the roller sets at low speed ratio in the friction drive device of the fifth embodiment shown in FIG. 7.

The first drive roller portion 1A and the first driven roller 2A constitute a first roller set to obtain a low speed ratio drive state shown in FIGS. 7 and 10, the second drive roller portion 1B and the second driven roller 2B constitute a second roller set to obtain an intermediate speed ratio drive state shown in FIG. 8, and the third drive roller portion 1C and the third driven roller 2C constitute a third roller set to obtain an overdrive speed ratio drive state shown in FIG. 9.

The eccentric shaft 6 is supported rotatably around the second center axis L2 by the frame member 5 through roller bearings 4 at its both ends, and its rotation angle phase is controlled by a servo motor 7. The first to third center axes L1 to L3 are positioned apart from each other, so that the angle phases of the first to third driven rollers 2A to 2C are set different from each other as shown in FIG. 7: the first center axis L1 is nearer to the center axis L0 of the drive roller 1 than the center axis L2, and the center axis L3 is further from the center axis L0 than the center axis L2.

This friction drive device operates as follows:

FIG. 9 shows the overdrive speed ratio drive state in which the third drive roller portion 1C contacts with the third driven roller 2C and drives it. In this state, the center axis L3 of the third driven roller 2C is rotated around the center axis L2 of the second driven roller 2B to be positioned nearer to the center axis L0 of the drive roller 1 and on the center connecting axis L passing through the center axes L0 and L2, and the contact point of the third drive roller portion 1C and the third driven roller 2C. The center distance between the axis L0 of the drive roller 1 and the third center axis L3 of the third driven roller 2C is set so that the third drive roller portion 1C depresses onto and contacts with the third driven roller 2C to transmit mechanical power between them at the overdrive speed ratio. Note that the first drive portion 1A and the first driven roller 2C are apart from each other and free from transmission of mechanical power, and the second drive roller portion 1B and the second driven roller 2B are also apart from each other and free from transmission of mechanical power.

When the servo motor 7 rotates the eccentric shaft 6 from the overdrive speed ratio drive state shown in FIG. 9 to the low speed ratio drive state in the rotational direction indicated by an arrow, the third center axis L3 moves apart from the center axis L0 of the drive roller 1, and the first center axis L1 moves nearer to the center axis L0, resulting in separation of the third drive portion 1C and the third driven roller 2C and contact between the first drive portion 1A and the first driven roller 1A. Accordingly, the third drive roller 1C becomes free from transmitting mechanical power, and the first drive roller portion 1A begins to transmit the mechanical power to the first driven roller 2A at the low speed ratio. Note that in this drive state, the second drive portion 1B and the second driven roller 2B are apart from each other and free from transmission of mechanical power, and the third drive roller portion 1C and the third driven roller 2C are also apart from each other and free from transmission of mechanical power.

The shift from the overdrive speed ratio to the low speed ratio is, performed without interruption of power transmission between the drive roller 1 and the driven roller 2 and without a shift jolt, when the angle phase between the first and third roller sets are set adequately. Moreover, this drive device eliminates a synchronizer device, because the roller set allows a slip on their contact surfaces.

Figure 11:
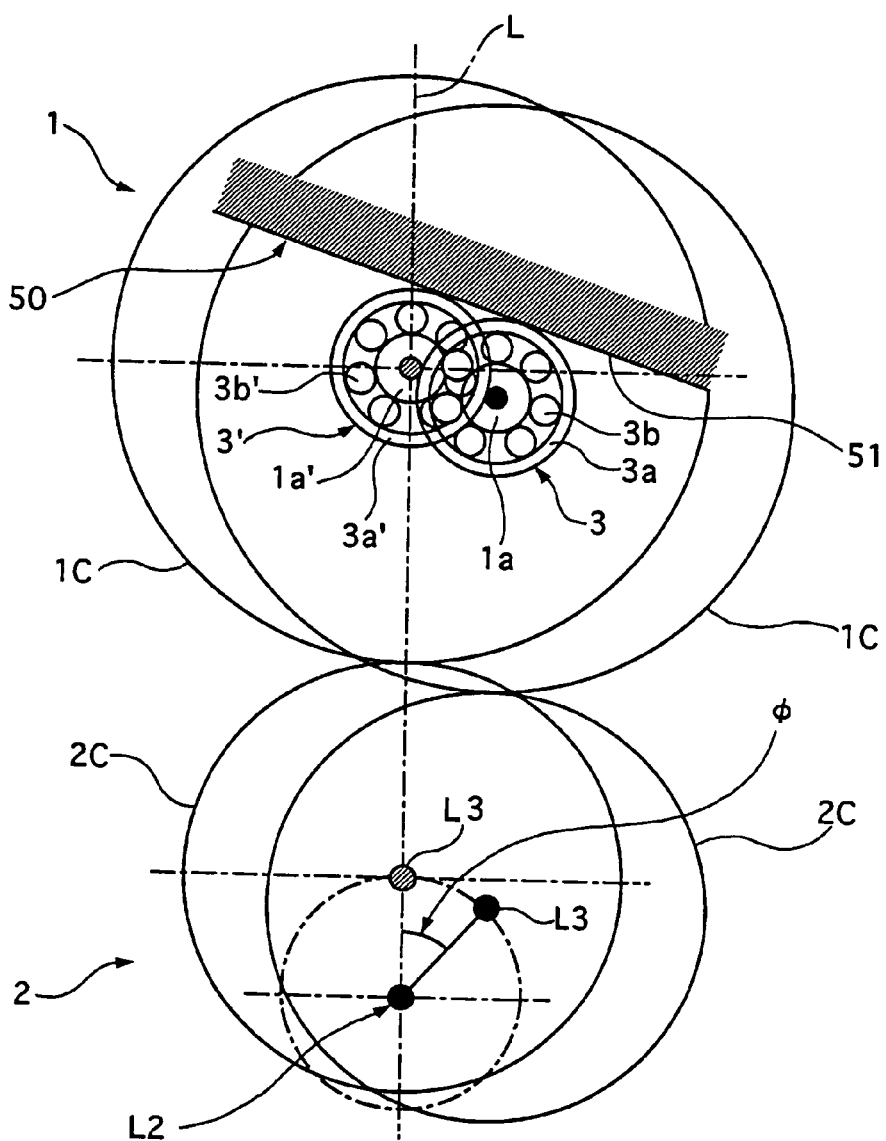
FIG. 11 is a schematic diagram showing relationships between the roller sets at the overdrive speed ratio in the friction drive device of the fifth embodiment shown in FIG. 7 when angle error occurs between the contacting roller sets.

When an error φ occurs in the angle phase of the eccentric shaft 6 as shown in FIG. 11, an outer race 3a of a roller bearing 3 of the drive roller 1 moves rolling along a cam slope 51 of a cam 50 of a frame member 5 from its normal position where illustrated numbers of roller bearing 3 and its parts are accompanied by a dash. The drive roller 1 moves nearer to the driven roller 2 supported on the eccentric shaft 6, which brings the center distance between the rollers 1 and 2 to be shortened, thus producing press force therebetween.

The shift to the intermediate speed ratio from the low speed ratio or the overdrive speed ratio is performed similarly to the above-described shifts.

The friction drive of the fifth embodiment has the following advantages: the drive device can obtain different speed ratios by selectively changing the roller sets to transmit the mechanical power. This ratio change can be performed without a shift jolt and interruption of power transmission between the drive roller 1 and the driven roller 2. The drive device eliminates a synchronizer device due roller-contact transmission of the mechanical power and rotation angle phase control of the eccentric shaft 6.

Figure 12:
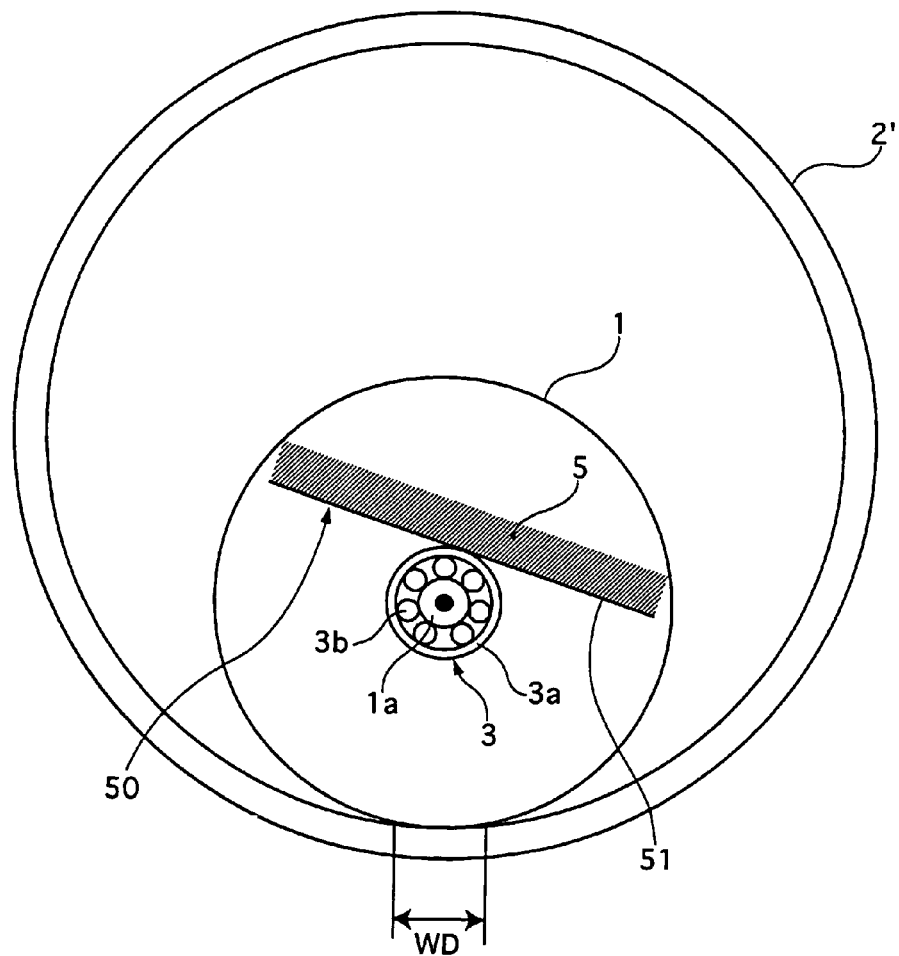
FIG. 12 is a schematic diagram of a friction drive device according to a sixth embodiment of the present invention.

Next, a friction drive device of a sixth embodiment according to the present invention will be described with the accompanying drawing of FIG. 12.

This friction drive device includes a columnar drive roller provided with a roller bearing 3 and an annular driven roller 2' having its inner surface with which the drive roller 1 contacts. The drive roller 1 and the annular driven roller 2' are rotatably supported by a frame member 5 so that the drive roller 1 receives press force from a cam 50 of the frame member 5 through an outer race 3a of the bearing 3 in contact with a cam slope 51 of the cam 50. The other parts of the drive device are similar to those of the friction drive device of the first embodiment shown in FIG. 1.

In the drive device, the drive roller 1 drives the driven roller 2' by the press force between the rollers 1 and 2' and transmits mechanical power between the rollers 1 and 2' similarly to operation of the first embodiment, except that a contact length WD of the rollers 1 and 2' becomes longer than that of the first embodiment, thereby reducing surface pressure at their contact point. This enables the rollers 1 and 2' to be pressed by stronger press force and transmit larger torque than that of the first embodiment.

The drive roller 1 and driven roller 2 may be formed as an annular drive roller and a columnar driven roller, respectively.

Figure 13:
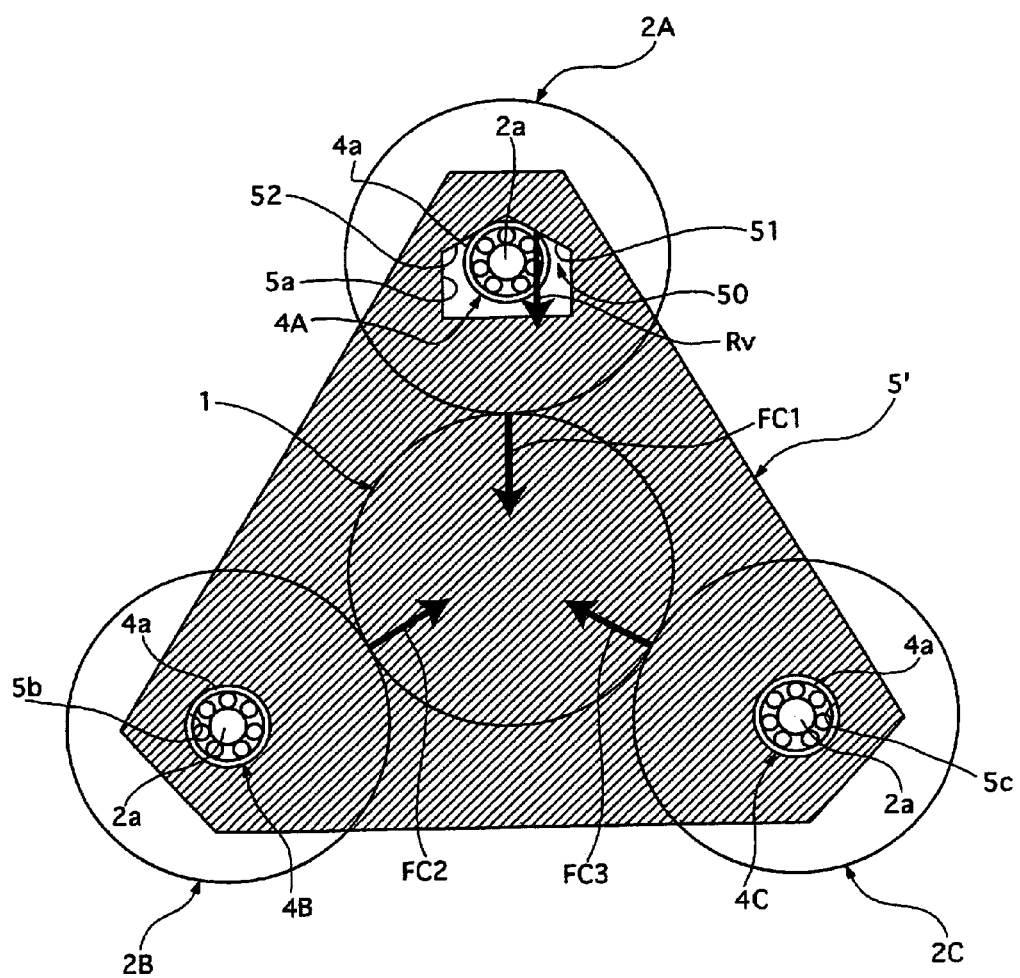
FIG. 13 is a schematic diagram of a friction drive device according to a seventh embodiment of the present invention.

Next, a friction drive of a seventh embodiment according to the present invention will be described with the accompanying drawings of FIG. 13.

This friction drive device has a drive roller 1 and three driven rollers 2A to 2C arranged around the drive rollers 1 and each contacting with it. The drive roller 1 is rotatably and freely in its radial-direction supported by a triangular frame member 5' at its center. The position of the drive roller 1 is determined by relations between the drive roller 1 and the driven rollers 2A to C. The triangular frame member 5' corresponds to a cam member of the present invention.

The three driven rollers 2A to 2C are rotatably supported by the frame member 5' at its apexes, respectively. The frame member 5' is formed with a pentagonal hole 5a, and two round holes 5b and 5c at the apexes. The apex with the pentagonal hole 5a is provided with came slopes 51 and 52 of a cam 50, and a roller bearing 4A of the driven roller 2A is inserted into the hole 5a and contacted with the cam 50. Accordingly, the driven roller 2A can move along the slopes 51 and 52 contacting with the cam 50 through the bearing 4, while the other rollers 2B and 2C are rotatably fixed to the frame member 5' through roller bearings 4B and 4C inserted in the holes 5b and 5c, respectively. The other parts of the drive device are similar to those of the drive unit of the first embodiment shown in FIG. 1.

When the drive roller 1 rotates and applies drive torque to the driven roller 2A, a roller bearing 4 of the driven roller 2A is pressed onto the cam 50, thereby receiving reaction force, not shown, from the cam 50. The vertical part Rv of the reaction force press the driven roller 2A against the drive roller 1, thereby producing press force Fc1 determined according to the vertical part Rv and acting on the drive roller 1. This brings the other driven rollers 2B and 2C to be pressed by the drive roller 1, so that the driven rollers 2B and 2C increase their press forces Fc2 and Fc3 acting to the drive roller 1. Hence, these press forces Fc1, Fc2, and Fc3 are balanced, which leads to the equations:

$Fc1 = Fc2 \cdot \sin 60° + Fc3 \cdot \sin 60°$, $Fc2 \cdot \cos 30° = Fc3 \cdot \cos 30°$.

Therefore $Fc1 = Fc2 = Fc3$.

This means that all the driven rollers 2A to 2C receive the press force of the same amount despite the fact that only one driven roller 2A is in contact with the cam 50. Their reaction forces from the driven rollers 2A to 2C to the frame member 5' are also balanced.

This brings the drive device to be small and light, because three driven rollers 2A to 2C can increase the total transmittable torque. When increasing driven rollers, the frame member 5' is provided a cam formed with a plurality of cam slopes, which are determined based on the number of the driven rollers and their alignment angle: for example, two cam slopes for four driven rollers.

This drive device of the seventh embodiment has advantages in that load acting between the bearing 4A and the cam 50 can be reduced, because three driven rollers 2A to 2C receives load from the drive roller 1, in addition to those of the drive device of the first to sixth embodiments. Note that the drive device may be constructed to have a sun driven roller, and a plurality of planet drive rollers arranged around the sun driven gear.

Figure 14:
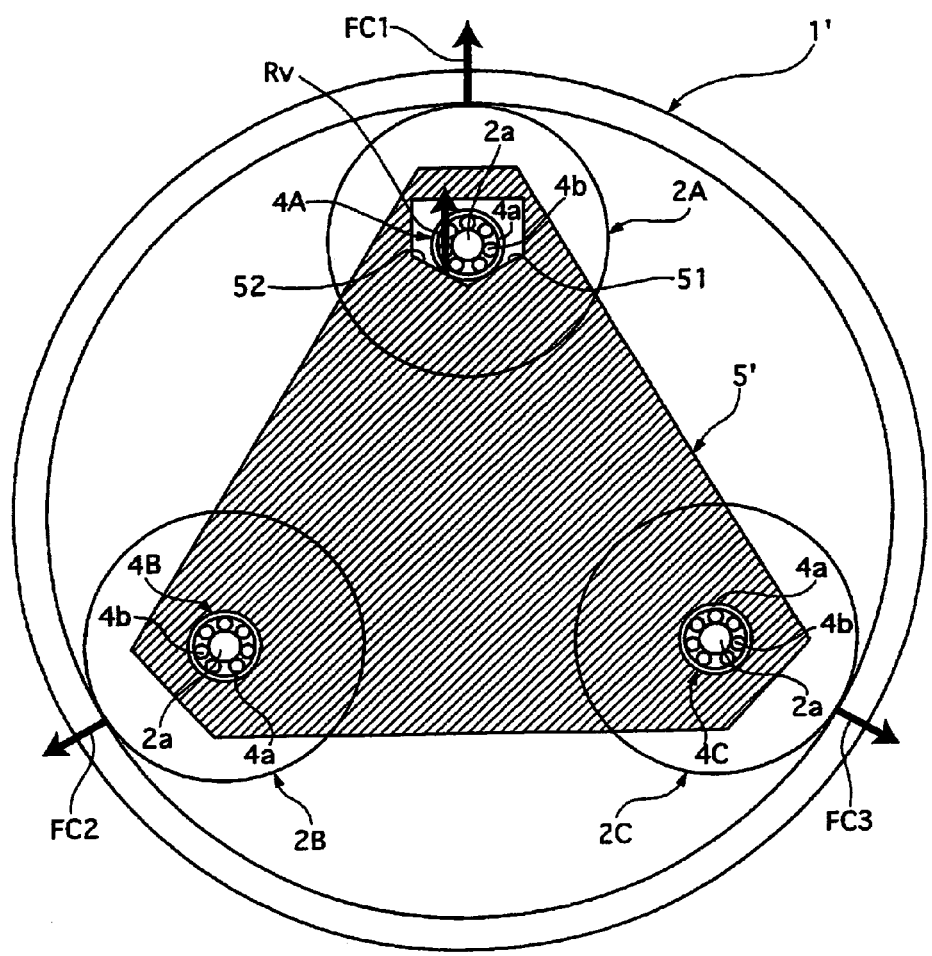
FIG. 14 is a schematic diagram of a friction drive device according to an eighth embodiment of the present invention.

Next, a friction drive device of an eighth embodiment of the present invention will be described with the accompanying drawing of FIG. 14.

This friction drive device has an annular drive roller 1' and three columnar driven rollers 2A to 2C pressed to contact with an inner surface of the drive roller 1'. The driven roller 2A is supported to contact with a cam 50 formed at one of three apexes of a triangular frame member 5' through a rolling bearing 4A, and the other driven roller 2B and 2C are rotatably fixed on the apexes through roller bearings 4B and 4C. Note that the cam 50 is formed with cam slopes 51 and 52, which is positioned at the side opposite to those of the seventh embodiment so that the driven roller 2A is pressed onto the inner surface f the drive roller 1' from the cam 50 through the bearing 4A. The other parts of the drive device are similar to those of the friction drive device of the seventh embodiment shown in FIG. 13.

The drive device operates basically the same as the drive device of the seventh embodiment except that contact length between the drive roller 1 and the driven rollers 2A to 2C, thereby reducing their surface pressures to transmit larger drive torque.

Figure 15:
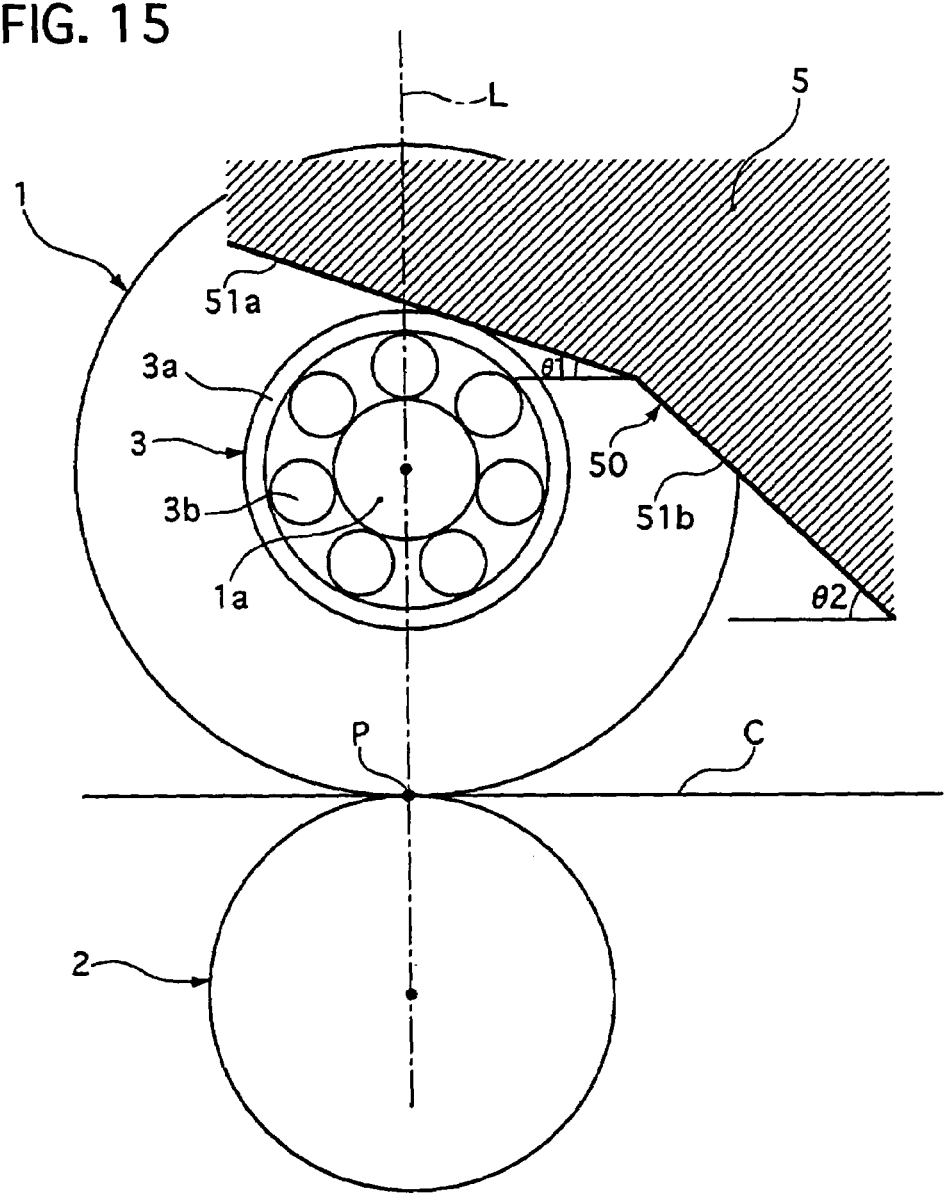
FIG. 15 is a schematic diagram of a friction drive device according to a ninth embodiment of the present invention.
Figure 16:
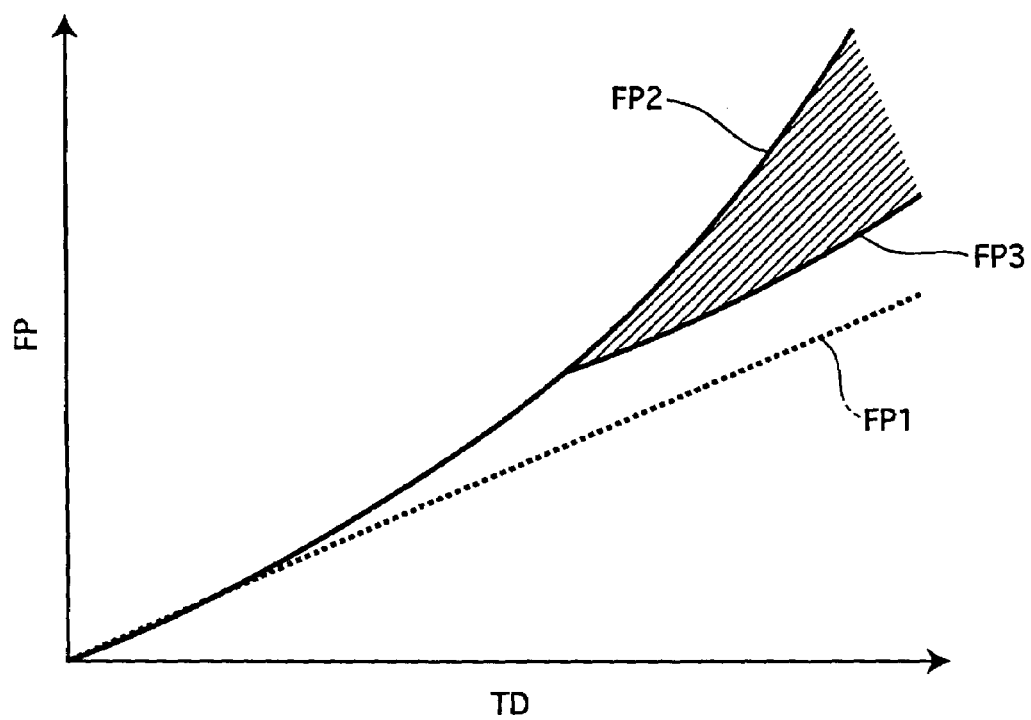
FIG. 16 is a diagram showing a relationship between press force and transmission torque of the friction drive device of the sixth embodiment shown in FIG. 16.

Next, a friction drive device of a ninth embodiment of the present invention will be described with the accompanying drawings of FIGS. 15 and 16.

This drive device of the ninth embodiment contains a cam 50 formed on a frame member 5. The cam 50 has a concave cam slope corresponding to the cam slope 51 of the first embodiment, consisting of a slower cam slope portion 51a and a steeper cam portion 51b. The slower cam slope portion 51a has an angle θ1 with respect to a tangent line at a contact point P of a drive roller 1 and a driven roller 2, while the steeper cam slope portion 51b has an angle θ2 with respect to the tangent line, where θ2>θ1. The cam slope portions 51a and 51b intersects with each other, and an outer race 3a of a roller bearing 3 provided on the drive roller 1 can move rolling along them. The other parts of the drive device are similar to those of the drive device of the first embodiment.

The outer race 3a moves rolling in contact with the slower cam slope portion 51a when transmission torque between the rollers 1 and 2 is small, while it moves rolling in contact with the steeper cam slope portion 51b when transmission torque between the rollers 1 and 2 is large. FIG. 16 shows a relationship between press force FP and transmitting torque TD. A line FP1 indicates an ideal one assumed that friction coefficient between the rollers 1 and 2 is constant, while a line FP2 indicates one of a conventional drive device with a wedge roller arranged between drive and driven rollers. A line FP3 indicates one of the drive device according to the ninth embodiment, which approaches the ideal line FP1. The shaded area indicates reduction amount of the press force compared to that produced in the conventional drive device, due to the stepper cam slope portion 51b. That is; the press force becomes substantially proportional to the transmission torque.

The drive device of the ninth embodiment has advantages in that excessive press force can be avoided in a large transmission torque range without a complicate device, thereby improving lifetime of parts of the drive device and its power transmission efficiency. In addition, the cam slope 51 with the slower and steeper can slope portions 51a and 51b can be easily manufactured at low costs.

In this drive device, the cam the cam slope 51 may have more than two different cam slope portions intersecting with each other.

Figure 20:
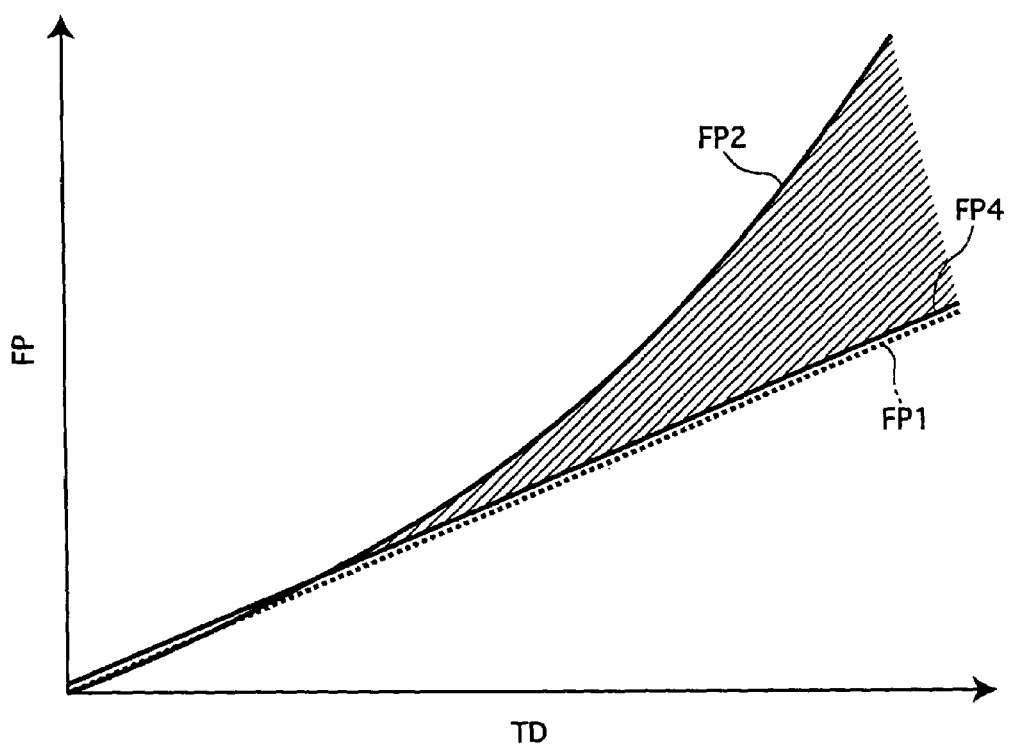
FIG. 20 is a diagram showing a relationship between press force and transmission torque of the friction drive device of a tenth embodiment shown in FIG. 17.

Next, a friction drive device of a tenth embodiment of the present invention will be described with the accompanying drawings of FIGS. 17 and 20.

Figure 17:
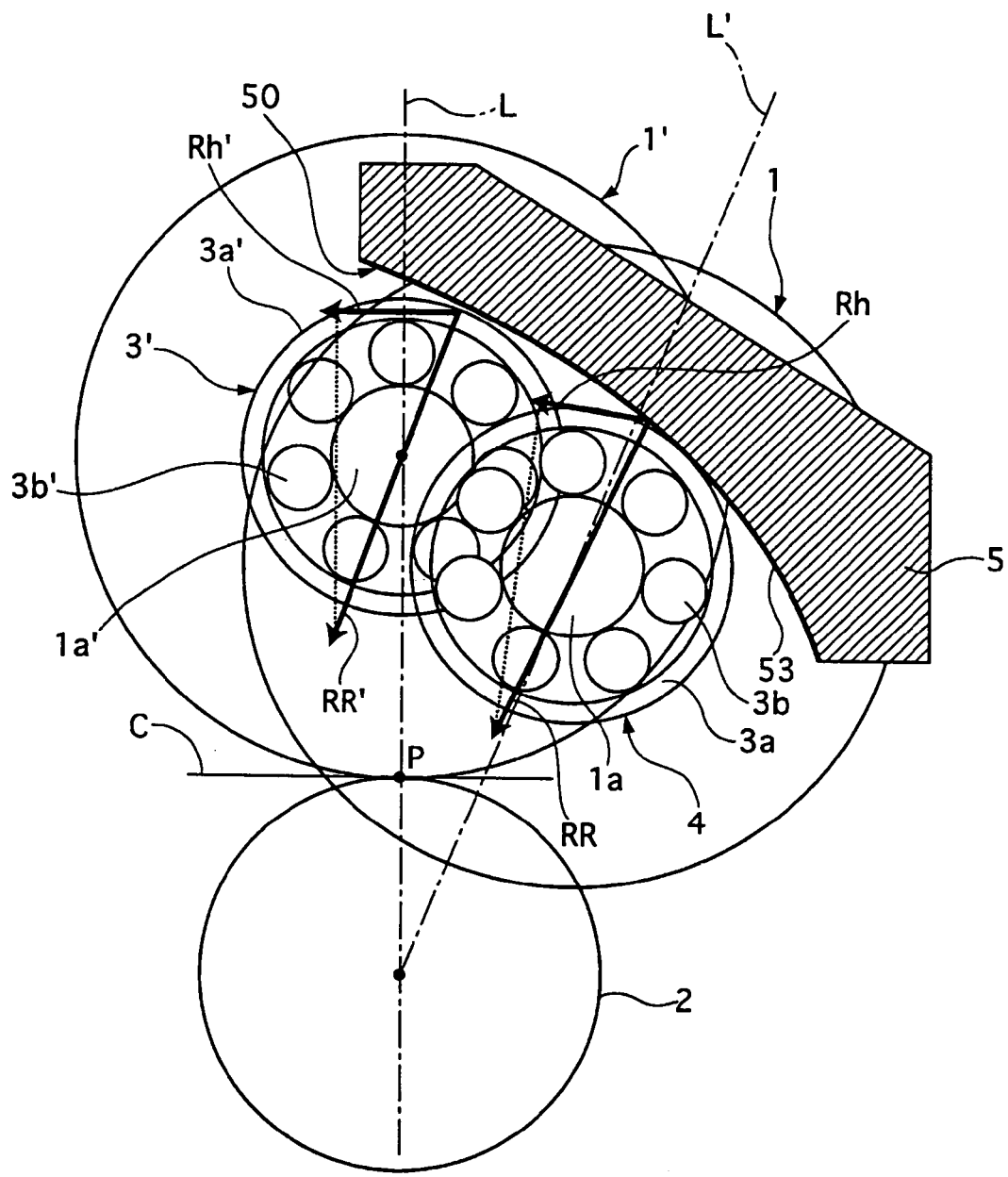
FIG. 17 is a schematic diagram of a friction drive device according to a tenth embodiment of the present invention.
Figure 18:
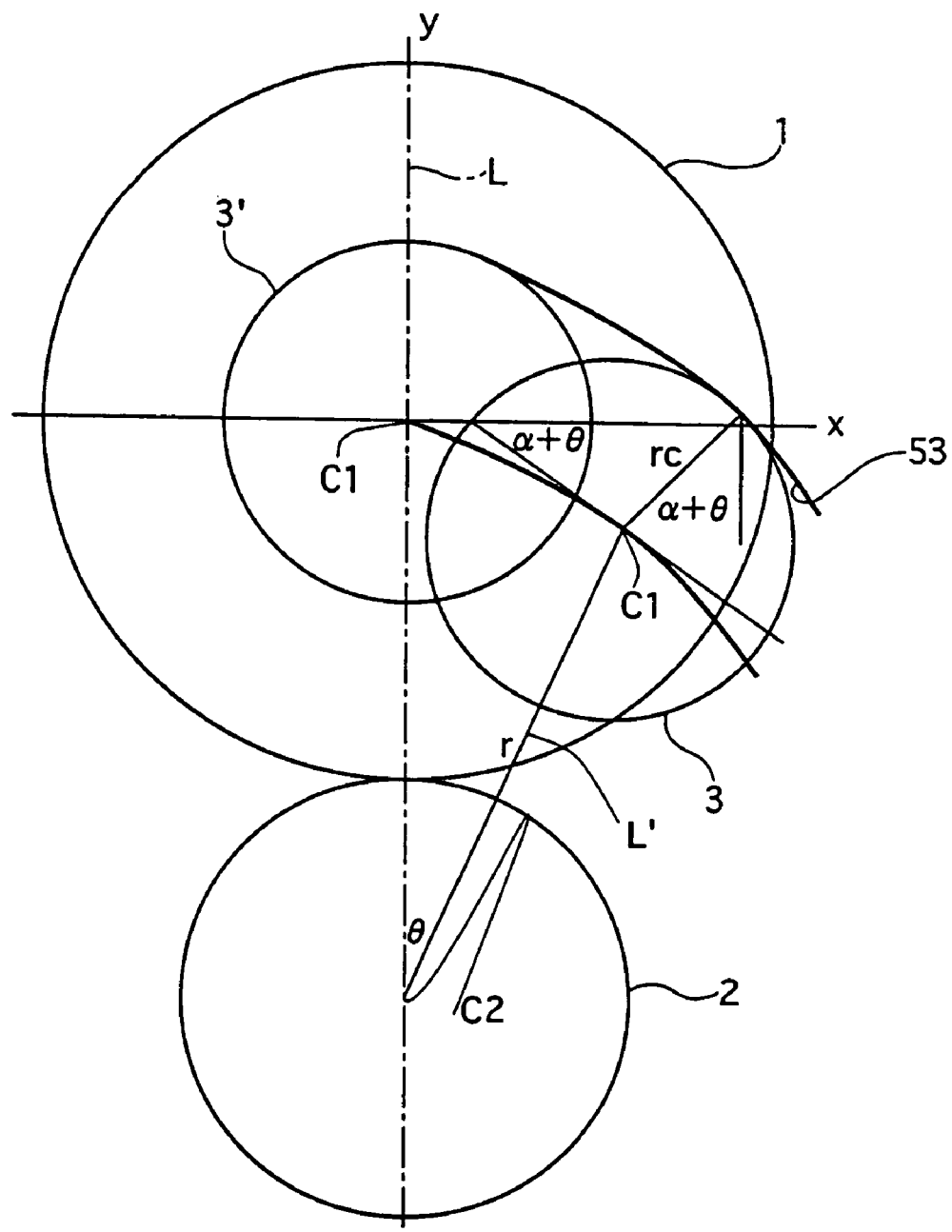
FIG. 18 is a diagram showing a relationship between movement of a drive roller and a cam used in the friction drive device of the tenth embodiment shown in FIG. 17.

In this drive device, as shown in FIGS. 17 and 18, a concave curve of a cam slope 53 is formed so that a slope angle is larger by a constant angle a than a center-line angle θ, where the slope angle is an angle between a tangent line at a point on the cam slope 53 and the tangent line at a contact point of drive and driven rollers, and the center-line angle θ is an angle difference of a center connecting line L that passes through centers C1 and C2 of the drive and driven rollers 1 and 2 between when the center connecting line L is on a no-torque position where the transmission torque is zero and when the center connecting line L' is tilted by the center-line angle θ from the no-torque position due to the transmission torque and passes through the point of the cam slope 53.

In detail, this drive device contains a cam 50 formed on a frame member 5. The cam 50 has a concave cam slope 53, corresponding to the cam slope 51 of the first embodiment, formed in a smooth curve that its tangent angle becomes larger with respect to a tangent line C at a contact point P of a drive roller 1 and a driven roller 2 in a large transmission torque range as a roller bearing 4 moves along the cam slope 53 and further away from a center connecting line L passing through the centers of the rollers 1 and 2.

The drive device operates as follows:

When the transmission torque is zero, the line L is positioned vertically, as shown in FIG. 18. This position of the line L is referred to as a no-torque position. The line L is inclined according to the transmission torque applied with respect to the line L at no transmission torque. This line L tilted is denoted by L in FIG. 18. When the line L7 is tilted at an angle θ due to the transmission torque, the angle of the cam slope 53 becomes (α+θ). The line L'tilted is, namely, angled by a constant angle α with respect to the cam slope 53. Let the size of the bearing 4 be zero, and center trace of the drive roller 1 corresponds to the profile of the cam slope 53. Under this condition, the trace of the drive roller 1 is expressed in the x·y coordinates shown in FIG. 18 by the following equations:

$$dy/dx = -\tan(\alpha+\theta)$$

$$x = r \sin\theta$$

$$y = r \cos\theta - r0$$

These equations indicates that the point (x, y) on the cam slope 53 is positioned on the line angled at θ, and the gradient of the cam slope 53 at the above point becomes tan (α+θ).

Solving the above equations under the boundary condition where θ=0 and r=r0, the following equations are obtained.

$$x = r_0 \exp\left\{-\frac{\theta \sec(\alpha+\theta)\sin\alpha}{\cos\theta + \sin\theta\tan(\alpha+\theta)}\right\}\sin\theta$$

$$y = r_0\left[\exp\left\{-\frac{\theta \sec(\alpha+\theta)\sin\alpha}{\cos\theta + \sin\theta\tan(\alpha+\theta)}\right\}\cos\theta - 1\right]$$

In actual, the bearing 3 of the drive roller 1 contacts with the cam slope 53. Therefore, let the radius of the bearing 3 be rc, and the configuration of the cam slope 53 is expressed by the following equations:

$$x_c = r_0 \exp\left\{-\frac{\theta \sec(\alpha+\theta)\sin\alpha}{\cos\theta + \sin\theta\tan(\alpha+\theta)}\right\}\sin\theta + r_c \sin(\alpha+\theta)$$

$$y_c = r_0\left[\exp\left\{-\frac{\theta \sec(\alpha+\theta)\sin\alpha}{\cos\theta + \sin\theta\tan(\alpha+\theta)}\right\}\cos\theta - 1\right] + r_c \cos(\alpha+\theta)$$

Figure 19:
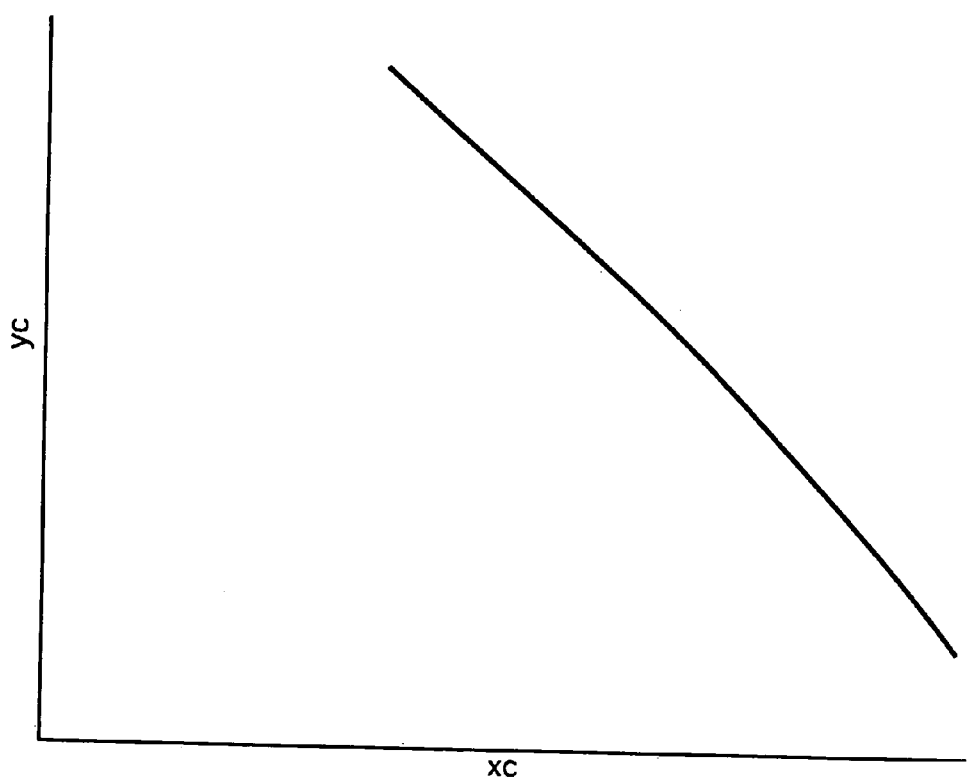
FIG. 19 is a diagram showing a cam profile on xc-yc coordinates of the cam Used in the friction drive device of the tenth embodiment shown in FIG. 17.

FIG. 19 shows a diagram plotted by the equations, which gives a concave surface figure. The press force FP4 produced by the drive device of the embodiment becomes substantially proportional to the transmission torque and approaches an ideal line FP1 under the condition where the friction coefficient between the bearing 3 and the cam slope 53 is constant.

The drive device of the tenth embodiment has advantages in that excessive press force can be avoided in a large transmission torque range without a complicate device, thereby improving lifetime of parts of the drive device and its power transmission efficiency. In addition, the press force can be produced proportional to the transmission torque, because the concave cam slope 53 is formed to have the smooth curve such that angles between the center connecting line L and the cam slope 53 of the cam 50 are kept constant wherever the bearing 3 provided on the drive roller 1 moves along the cam slope 53.

Figure 21:
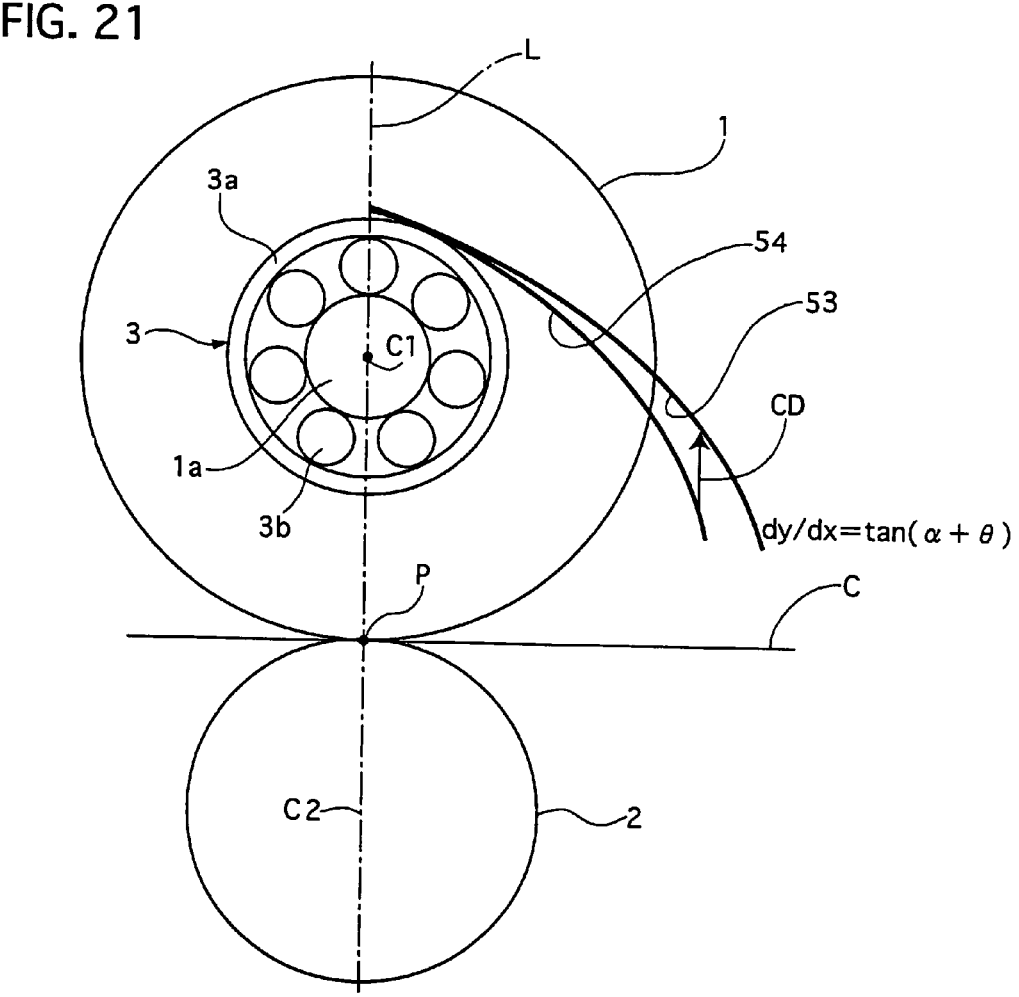
FIG. 21 is a schematic diagram of a friction drive device according to an eleventh embodiment of the present invention.

Next, a friction drive device of an eleventh embodiment of the present invention will be described with the accompanying drawing of FIG. 21.

In this drive device, a cam slope 54 of a cam is formed so that a slope angle becomes larger than as a drive roller 1 moves along the cam slope 54 and further away from a no-torque position of a center connecting line L passing through centers c1 and C2 of the drive roller 1 and a driven roller 2, and the slope angle is larger by a constant angle than a center-line angle, where a slope angle of a cam slope 54 is an angle between a tangent line of the cam slope 54 and the tangent line at a contact point P of the drive and driven rollers 1 and 2, and the no-torque position is a position where the center connecting line L is positioned when the transmission torque is zero, and the center-line angle is an angle difference of the center connecting line L between when the center connecting line L is on the no-torque position and when the center connecting line L is tilted from the no-torque position due to the transmission torque and passes through the point of the cam slope 54.

The drive device has a cam 50 formed on a frame member 5. The cam 50 has a concave cam slope 54 corresponding to the cam slope 51 of the first embodiment, formed in a smooth curve that its slope angle becomes larger with respect to the tangent line C at the contact point P of a drive roller 1 and a driven roller 2 than the center line angle in-a large transmission torque range as a roller bearing 4 moves along the cam slope 53 and further away from a center connecting line L passing through the centers of the rollers 1 and 2, as well as the drive device of the tenth embodiment shown in FIG. 17.

This slope angle is set, for example: the cam slope 54 is formed so that an angle between a tangent line of the cam slope 54 and the tangent line C at the contact point P becomes larger so as to compensate predicted elastic deformation of parts of the friction drive device due to the transmission torque as the drive roller 1 moves along the cam slope 54 and further away from a position where a center connecting line L passing through centers C1 and C2 of the drive and driven rollers 1 and 2 is positioned when the transmission torque is zero.

The configuration of the cam slope 54 of this embodiment is determined allowing for displacement, so that its slope angle becomes larger by the predicated elastic deformation amount CD between the cam 50 and the driven roller in the large transmission torque range than the cam slope 53 of the drive device of the tenth embodiment.

In a large transmission torque range, press force caused elastic deformations of the contact point P of the rollers 1 and 2, roller bearings 3 and 4, the cam 50, and a frame member 5, resulting in separation movement between the cam 50 and the driven roller 2 rotatably fixed to the frame member 5. The drive device has the cam slope 54 formed with allowing for the separation movement due to the elastic deformations so that the press force can be produced substantially proportional to the transmission torque between the rollers 1 and 2.

Let the further separation amount, equal to the elastic deformation amount CD, between the cam 50 and the driven roller when the press force Fc is produced between the rollers 1 and 2 be function Δy (Fc), and the following equations are obtained.

$$x_c = r_0 \exp\left\{-\frac{\theta \sec(\alpha+\theta)\sin\alpha}{\cos\theta + \sin\theta\tan(\alpha+\theta)}\right\}\sin\theta + r_c \sin(\alpha+\theta)$$

$$y_c = r_0\left[\exp\left\{-\frac{\theta \sec(\alpha+\theta)\sin\alpha}{\cos\theta + \sin\theta\tan(\alpha+\theta)}\right\}\cos\theta - 1\right] + r_c \cos(\alpha+\theta) - \Delta y(F_c)$$

The drive device of the eleventh embodiment has advantages in that excessive press force can be avoided in a large transmission torque range without a complicate device, thereby improving lifetime of parts of the drive device and its power transmission efficiency. In addition, the drive device can obtain the press force proportional to the transmission torque even when the center distance between the rollers due to the elastic deformation of the parts of the drive device in the large transmission torque range.

The cam slope may be formed to have a concave curve whose angle changes smoothly with respect to the tangent line C at the contact point C of the drive and driven rollers 1 and 2 as the drive roller 1 moves further away from the line L at no transmission torque.

While there have been particularly shown and described with reference to preferred embodiments thereof, it will be understood that various modifications may be made therein, and it is intended to cover in the appended claims all such modifications as fall within the true spirit and scope of the invention.

For example, a friction drive device may be of a planetary roller device type with a sun roller, an annular roller arranged around the sun roller, and planet rollers arranged between the sun roller and the annular roller, by combining the constructions of the friction drive devices of the seventh and eighth embodiments.

In the above embodiments, the drive roller and the driven roller may be replaced with one another. Therefore, the first roller of the present invention corresponds to one of the drive roller and the driven roller, and the second roller corresponds to the other of them.

The entire contents of Japanese Patent Applications No. 2003-433910 filed Dec. 26, 2003 and No. 2004-57639 filed March 2 are incorporated herein by reference.

What is claimed is:

1. A friction drive device comprising:
   a first roller acting as one of an input roller and an output roller directly contacted with the input roller and having a support part, the support part being apart from a contactable surface of said first roller in a rotating axis direction of said first roller;
   a second roller that acts as the other of the input roller and the output roller and receives press force from said first roller at a first contact point of said first and second rollers so as to transmit mechanical power between said first and second rollers; and
   a cam member located apart from the contactable surface in the rotating axis direction and supporting said first roller through the support part and having a cam formed with a cam slope on which the support part of said first roller is pressed by reaction torque from said second roller that is caused by transmission torque applied from said first roller, the cam slope being formed to have an angle with respect to a tangent line at the first contact point so that a center connecting line passing through a center of said first roller and a center of said second roller can move relative to the cam in a circumferential direction of said second roller to depart from the center connecting line located when the transmission torque is zero and a second contact point of the support part of said first roller and the cam slope can approach the center of said second roller as the transmission torque increases.

2. The friction drive device of claim 1, wherein the cam slope includes a first cam slope portion and a second slope portion whose directions are opposite to each other with respect to the tangent line at the first contact point of said first and second rollers.

3. The friction drive device of claim 1, wherein the cam slope is formed to have a concave shape with a plurality of cam slope portions whose angles are different from each other with respect to the tangent line at the first contact point of said first and second rollers.

4. The friction drive device of claim 1, wherein the cam slope is formed to have a concave curve.

5. The friction drive device of claim 4, wherein the concave curve is formed to have the same tangent angle on the cam slope with respect to the center connecting line when the support part of said first roller moves along the concave curve.

6. The friction drive device of claim 4, wherein the concave curve is formed so that a slope angle is larger by a constant angle than a center-line angle, where the slope angle is an angle between a tangent line at the point of the support part of said first roller and the cam slope and a tangent line at the first contact point of the first and second rollers, and the center-line angle is an angle difference of the center connecting lines positioned between when the center connecting line is on the no-torque position and when the center connecting line is tilted from the no-torque position due to the transmission torque to pass through the second contact point of the support part and the cam slope.

7. The friction drive device of claim 1, wherein the cam slope is formed so that a tangent angle on the cam slope is set to be constant with respect to the center connecting line located when the support part of said first roller moves along the cam slope, contacting with the cam slope.

8. The friction drive device of claim 1, wherein the cam slope is formed so that a slope angle becomes larger as the support part of said first roller moves along the cam slope and further away from a no-torque position, and the slope angle is larger by a constant angle than a center-line angle, where the slope angle is an angle between a tangent line of the cam slope and a tangent line at the first contact point of said first and second rollers, the no-torque position is a position of the center connecting line where the center connecting line is positioned when the transmission torque is zero, and the center-line angle is an angle difference of the center connecting lines positioned between when the center connecting line is on the no-torque position and when the center connecting line is tilted from the no-torque position due to the transmission torque to pass through the second contact point of the support part and the cam slope.

9. The friction drive device of claim 1, wherein the cam slope is formed so that an angle between a tangent line of the cam slope and the tangent line at the first contact point of said first and second rollers becomes larger so as to compensate a predicted elastic deformation of parts of the friction drive device due to the transmission torque as said first roller moves along the cam slope and further away from a position where the center connecting line is positioned when the transmission torque is zero.

10. The friction drive device of claim 1, wherein said first and second roller are pre-loaded at the first contact point.

11. The friction drive device of claim 1, wherein the support part of said first roller is rotatable so as to roll on the cam slope.

12. The friction drive device of claim 1, wherein said first and second rollers constitute a plurality of roller sets that have diameters different from each other so that one set of the roller sets which is selected by changing center distances of the roller sets can transmit the mechanical power therebetween.

13. The friction drive device of claim 12, wherein at least one of said first and second rollers are supported on an eccentric shaft so that center distances of said first and second rollers can be changed by rotating the eccentric shaft.

14. The friction drive device of claim 1, wherein one of said first and second rollers is made up of an annular roller having an inner surface with which the other of said first and second rollers contacts.

15. The friction drive device of claim 1, wherein one of said first and second rollers is made up of a sun roller, and the other of said first and second rollers is made up of a plurality of planet rollers arranged at a periphery of said sun roller, one of the planet rollers being supported by the cam.

16. The friction drive device of claim 1, wherein one of said first and second rollers is made up of an annular roller, and the other of said first and second rollers is made up of a plurality of planet rollers arranged inside of the annular roller, one of the planet rollers being supported by the cam.

17. The friction drive device of claim 1, wherein the cam member is fixed when the friction drive device is in operation.

18. The friction drive device of claim 1, wherein the cam member cannot rotate about its center when the friction drive device is in operation.

* * * * *